Dec. 18, 1934.  G. A. MARTIN  1,984,888
BRAKE FOR SHEET FEEDING APPARATUS
Filed July 6, 1928
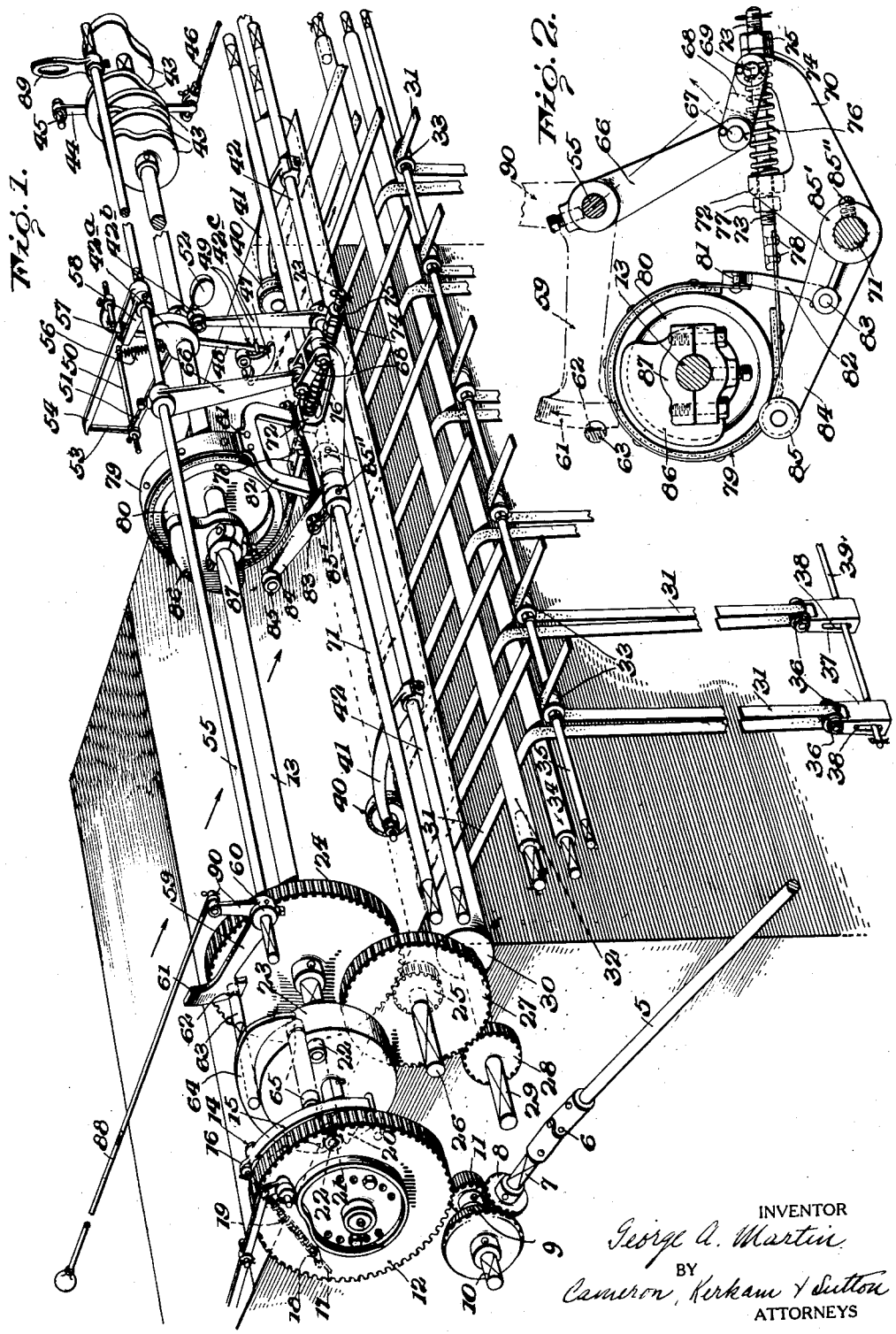
INVENTOR
George A. Martin
BY
Cameron, Kirkham & Sutton
ATTORNEYS Patented Dec. 18, 1934

1,984,888

UNITED STATES PATENT OFFICE 1,984,888

BRAKE FOR SHEET FEEDING APPARATUS

George A. Martin, Pearl River, N. Y., assignor to Dexter Folder Company, New York, N. Y., a corporation of New York Application July 6, 1928, Serial No. 290,748

30 Claims. (Cl. 188—135)

This invention relates to sheet feeding apparatus and more particularly to brakes for stopping parts of such apparatus when the same are disconnected for any reason from their driving means.

One object of the invention is to provide an improved brake for parts of the apparatus driven through a clutch.

Another object of the invention is to provide brake operating mechanism controlled by the operation of the clutch.

Another object of the invention is to provide an improved brake and operating mechanism therefor that is interconnected with the clutch so as to be manually or automatically controlled through the operation of said clutch.

A further object of the invention is to provide an improved brake which is interconnected with clutch operating mechanism so as to be released when the clutch is connected and applied when said clutch is disconnected.

A further object of the invention is to provide an expeditious, highly efficient, and simply constructed brake, which is relatively inexpensive to manufacture and install.

Other objects of the invention will appear as the following description thereof proceeds.

In order to more clearly understand the invention, reference may be had to the appended drawing which illustrates one embodiment of the inventive idea and wherein:

Fig. 1 is a detail perspective view of sheet feeding apparatus equipped with a band brake embodying the present invention and having a clutch the parts of which are shown separated for purposes of clearer illustration; and Fig. 2 is a side elevation of the band brake looking from the left of Fig. 1, parts of the clutch operating mechanism being shown in dot and dash lines.

Referring to the drawing, wherein like reference characters designate like parts throughout the several views, 5 indicates a shaft driven from any suitable source of power (not shown) and connected at one end by a universal joint 6, with a stub shaft 7 that is journaled in suitable bearings on the frame work of the machine at one side thereof. Fixed on the stub shaft 7 is a bevel gear 8 that meshes with a bevel gear 9 which is fixed on a stub shaft 10 that is also journaled in suitable bearings on the side of the machine frame work carrying the stub shaft 7. The stub shaft 10 has rigidly secured thereon a pinion 11 that meshes with a large gear 12 which is loosely mounted on a driven shaft 13 journaled in suitable bearings on the machine frame work and extending transversely thereof. Pivoted at 14 on the gear 12 is a pawl 15 the tail 16 of which is pivotally connected with one end of a rod 17. The opposite end of the rod 17 passes through a suitable opening in a stud 18 carried by the gear 12, and a coil spring 19 interposed between the stud 18 and the tail 16 of the pawl 15, is carried on the rod 17 and normally acts to swing the nose 20 of said pawl inwardly toward the axis of the gear 12. The pawl 15 is provided in the nose 20 thereof with a recess 21 which is adapted to be engaged over a roller 22 that is carried by a clutch disk 23 fixed on the shaft 13. The gear carried pawl 15, the roller carrying disk 23, and a cam 64 and operating means therefor, are shown separated in Fig. 1 for purposes of clearer illustration. In actual practice, however, said parts are arranged relatively close to each other so that the pawl 15 may engage the roller 22 as indicated in dotted lines in Fig. 1 and the cam 64 may be moved into or out of the path of travel of a roller 65 carried on said pawl. It will appear from the foregoing that when the clutch comprised by the pawl 15, roller 22 and disk 23, is connected, the shaft 13 will be driven by the above described gearing.

Fixed on the shaft 13 is a spur gear 24 which meshes with a spur pinion 25 rigidly secured on a stub shaft 26 that is journaled in suitable bearings on the machine frame work at the side thereof carrying the shaft 5. The shaft 26 also has rigidly secured thereto a spur gear 27 which meshes with a spur pinion 28 that is fixed on one end of a feed roller shaft 29 journaled in suitable bearings on the machine frame work and extending transversely thereof. This feed roller shaft 29 carries a feed roller 30 around which passes a series of sheet conveying tapes 31 for feeding sheets forwardly from a suitable source of supply to a point of delivery for said sheets. The upper reaches of the tapes 31 pass over a roller 32, and the lower reaches of said tapes pass over rollers 33 and a roller 34. The rollers 32 and 34 extend transversely of the machine and are journaled in suitable bearings on the frame work thereof. The rollers 33 are fixed on a shaft 35 that is also journaled in suitable bearings on said frame work and extends substantially parallel with the shafts 32 and 34.

Between the roller 34 and the shaft 35 the tapes 31 are looped downwardly and provided with rollers 36 that carry counterweights 37 for taking up the slack in said tapes. These counterweights are provided with openings 38 for a rod 39 that serves to connect said counterweights together.

The usual drop rollers 40 are carried on arms 41 that are secured to a shaft 42 which extends transversely of the machine and is journaled in suitable bearings on the frame work thereof. Fixed on the shaft 13 is a cam 42ª that engages a roller 42ᵇ on an arm 42ᶜ which is rigidly secured on the rockshaft 42. The drop rollers are raised by the cam 42ª when a sheet is fed between said rollers and the feed roller 30, and said drop rollers thereafter lower by gravity onto the sheet which is then forwarded by the tapes 31 as previously described. Cams 43, fixed on the shaft 13 act to control various devices of the sheet feeder not shown and forming no part of the present invention. One of these cams acts to swing a lever 44 pivoted at 45 on the machine frame work and connected with one end of a rod 46 for operating one of said devices of the feeder.

Journaled in suitable bearings (not shown) above the feed roller 30 is a caliper element 47 which, when more than one sheet at a time is fed between the same and said roller, swings forwardly and moves an arm 48 in the same direction through the engagement of the lower end of said arm with one of a pair of pins 49 that receive said end of arm 48 and project laterally from one side of the caliper element 47. This arm 48 is fixed on one end of a rock shaft 50 that extends transversely of the machine and is journaled in suitable bearings on a stationary part thereof. Fixed on the opposite end of the rockshaft 50 is a bell crank one arm 51 of which is provided with a counterweight 52 that normally tends to hold the other arm 53 of said bell crank under the free end of an arm 54 so as to prevent downward movement thereof. This arm 54 is loose on a rockshaft 55 that extends transversely of the machine and is journaled in suitable bearings on the frame work thereof. When the caliper element 47 and the arm 48 are swung forwardly, as above described, the rockshaft 50 is rotated so as to disengage the arm or detent 53 from the end of the arm 54. The arm 54 is then pulled down by a spring 56 and through the engagement of a lug 57 on said arm with a juxtaposed arm 58 fixed on the shaft 55, the latter is rotated so as to swing one arm 59 of a bell crank lever 60, downwardly. This bell crank lever is fixed on the rockshaft 55 at the end thereof adjacent the above described driving gearing, and the arm 59 of said bell crank carries a cam 61 that is engaged in a cam groove 62 of a rod 63. This rod 63 is journaled in suitable bearings at one side of the machine for longitudinal movement toward and away from the gear 12. Fixed on the end of the rod 63 opposite that provided with the cam groove 62 is a crescent-shaped cam 64 which, together with the rod 63 is moved toward said gear when the cam 61 is depressed as before described. Movement of the cam 64 towards the gear 12 brings said cam into the path of travel of a roller 65 that is journaled on the pawl 15. Under these conditions, the roller 65 will, during rotation of the gear 12 and the pawl 15, ride over the outer surface of the cam 64 and thus disconnect the drive for shaft 13 from the shaft 5.

Interconnected with the clutch operating mechanism just described, is a band brake and operating mechanism therefor and preferably constructed and operated as follows. Fixed on the rockshaft 55 so as to be swung upwardly when the cam 61 is depressed, is an arm 66 the free end of which is pivotally connected at 67 with a toggle member 68 that is pivotally connected at 69 with a band shifting arm 70. The arm 70 is loosely mounted on a stay shaft 71 that extends transversely of the machine and connects the opposite side frames thereof together. Projecting laterally from the band shifting arm 70 and disposed between the pivot 69 and the shaft 71, is an apertured lug 72 through which passes a rod 73 that is screw threaded at its forward end to receive an adjusting nut 74 and a lock nut 75. Carried on the rod 73 between the adjusting nut 74 and the lug 72 is a spring 76 the tension of which may be adjusted as desired by the nut 74, to maintain a nut 77 in engagement with the rear face of the lug 72. This nut 77 is carried on the screw threaded end of the rod 73 opposite that carrying the nuts 74 and 75, and rearwardly of said nut 77 the rod 73 is connected as by rivets 78 with one extremity of a brake band 79. The brake band 79 passes around a brake drum 80 fixed on the shaft 13, and the opposite end of said brake band is connected as by rivets 81, with the free end of a yoke 82 extending upwardly between the brake drum 80 and the lug 72. This yoke 82 is pivoted as at 83, on a rearwardly extending lever 84 that is loosely mounted on the shaft 71 and provided at its free end with a roller 85. The arm 70 and the lever 84 are both retained against movement along the stay shaft, by collars 85' secured thereon as by set screws 85''.

When the shaft 55 is rotated to move the cam 61 downwardly and disconnect the clutch, the arm 66, as before stated, is lifted so that the toggle comprised by said arm and the toggle member 68 is straightened and the arm 70 depressed. As the arm 70 is depressed, the lug 72 through the medium of the spring 76, nut 74 and rod 73 pulls the lower end of the brake band 79 forwardly so that the brake band is shifted about the brake drum 80. This shifting movement of the brake band 79 about the brake drum 80 lifts the yoke 82 and the lever 84 thereby bringing the roller 85 into the path of a cam 86 that is adjustably mounted on the shaft 13, as by a split collar 87. Engagement of the cam 86 with the roller 85 acts to tighten the brake band 79 on the brake drum 80 so that the shaft 13 and parts connected therewith are immediately retarded and stopped when the clutch is disconnected.

The clutch may be disconnected and the brake applied either automatically by operation of the caliper element 47, or by pulling rearwardly on either of a pair of operating handles 88 and 89. The clutch is connected and the brake released, by pushing either of the operating handles 88 or 89 forwardly. The operating handle 88 is secured at one side of the machine to the arm 90 of the bell crank 60 and the operating handle 89 is fixed on the rockshaft 55 at the opposite side of the machine. When either of handles 88 or 89 is pushed forwardly the rod 63 is moved to the right by cam 61 so that the cam 64 is removed from the path of travel of the roller 65 carried by pawl 15. The spring 19 then acts to engage the pawl 15 with the roller 22 on clutch disk 23 so that the parts of the clutch are connected to drive the shaft 13. While the clutch is being connected in this manner, the shaft 55 is rotated to depress arm 66 and thereby break the toggle comprised by said arm and the toggle member 68. The arm 70 is thus lifted and through engagement of the lug 72 with the nut 77, the rod 73 is moved rearwardly thereby loosening the brake band 79 so that the yoke 72 and the lever 84 drop and the roller 85 is removed from the path of cam 86.

When the shaft 55 is rotated to connect the clutch and release the brake, the arm 58 is lifted, thereby lifting the arm 54 through engagement of the lug 57 thereon with the arm 58. When the arm 54 is lifted, the weight 52 swings the arm 53 under and into engagement with the free end of the arm 54 and at the same time rotates the shaft 50 so that the connections therefor with the caliper element 47 are moved to swing said element rearwardly to its normal position.

It will appear from the foregoing, that by the present invention an improved band brake is provided that can be interconnected with and controlled by clutch operating mechanism and which acts to quickly retard and stop devices driven through the clutch when the parts thereof are disconnected, either manually or automatically. Moreover, it will further appear that while the brake of the present invention has great utility in connection with sheet feeding apparatus that has been described in some detail, said brake may be used in any machine or instrumentality where the use of brakes is desirable. It is therefore to be expressly understood that while one embodiment of the invention has been herein illustrated and described in detail, the invention is not limited to said embodiment or otherwise than by the terms of the appended claims.

What is claimed is:

1. In combination, a driven shaft, a brake drum fixed thereon, a brake band shiftable about the brake drum to brake applying and releasing positions, band shifting means connected with one end of the brake band, and brake applying means comprising a cam on the driven shaft and a pivoted lever connected with the other end of the brake band and movable thereby into engagement with the cam.

2. In combination, a driven shaft, a brake drum fixed thereon, a brake band shiftable about the brake drum, band shifting means connected with one end of said brake band, and brake applying means comprising a cam on the driven shaft, a pivoted lever adjacent said cam, and a yoke connecting said lever with the other end of the brake band and movable thereby to swing the lever into engagement with said cam.

3. In combination, a driven shaft, a brake drum fixed thereon, a brake band carried on said drum, and brake applying and releasing devices comprising a pivoted lever connected with one end of the brake band, means for swinging said lever, a cam fixed on the driven shaft, and a brake lever connected with the other end of the brake band and movable into and out of engagement with said cam.

4. In combination, a driven shaft, a brake drum fixed thereon, a brake band carried on said brake drum, a pair of pivoted levers connected with opposite ends of the brake band respectively, a roller on one of said levers, a cam on the driven shaft adapted to engage said roller, and means for swinging the other lever to engage said roller with or disengage the same from said cam and thereby apply or release the brake.

5. In combination, a driven shaft, a brake drum fixed thereon, a brake band carried on said brake drum, a pair of pivoted members connected with opposite ends of the brake band respectively, a cam on the driven shaft, and means for swinging one of said members to move the other into and out of engagement with said cam.

6. In combination, a driven shaft, a brake drum fixed thereon, a brake band carried on said brake drum, a band shifting lever yieldably connected with one end of the brake band, a brake lever connected with the opposite end of the brake band, a cam adjustably mounted on the driven shaft, and means for swinging said band shifting lever whereby the brake lever is moved into or out of the path of travel of said cam.

7. In combination, a driven shaft, a brake drum fixed thereon, a brake band carried on said brake drum, a pivoted arm connected with one end of the brake band, a lever connected with the opposite end of the brake band, a cam on the driven shaft, and means for swinging said arm whereby the brake lever is moved into or out of the path of travel of said cam.

8. In combination, a driven shaft, a brake drum fixed thereon, a brake band carried on said brake drum, a cam on the driven shaft, a stay shaft, a pair of members pivoted on said stay shaft and connected with opposite ends of the brake band respectively and means for swinging one of said members to move the other into and out of the path of travel of said cam.

9. In combination, a driven shaft, a brake drum fixed thereon, a brake band carried on the brake drum, a pair of pivoted members connected with opposite ends of the brake band respectively, a cam on the driven shaft, and mechanism for swinging one of said members to move the other into and out of the path of the cam, said mechanism comprising a rock shaft, an arm fixed on the rock shaft, a toggle connection between said arm and one of said pivoted members, and means for rocking said rock shaft.

10. In combination, a driven shaft, a brake drum fixed thereon, a brake band carried on said brake drum, a stay shaft, a pivoted arm mounted on the stay shaft and yieldably connected with one end of the brake band, a lever pivoted on said stay shaft, a yoke connecting said lever with the opposite end of the brake band, a cam on the driven shaft, and mechanism for swinging the pivoted arm comprising a rock shaft, means for rocking the same, a member fixed on said rock shaft to move therewith, and a toggle connection between said member and said pivoted arm.

11. In a clutch throw-out and brake applying mechanism for sheet feeders, a clutch controlled rotatable element connected with a part of said feeder to drive the same, a brake drum secured to said element to rotate therewith, a brake band extending about the brake drum and normally free with respect thereto, and means adapted to bodily shift the brake band circumferentially of said drum and tighten said brake band thereon.

12. In a clutch throw-out and brake applying mechanism for sheet feeders, a clutch controlled rotatable shaft connected with and adapted to drive a sheet advancing device of the feeder, a brake drum secured on said shaft to rotate therewith, a brake band normally extending loosely about the brake drum and within which the latter normally rotates, and mechanism adapted to bodily shift the brake band in opposite directions circumferentially of said drum and tighten and loosen said brake band relative thereto.

13. In a clutch throw-out and brake applying mechanism for sheet feeders, a clutch controlled rotatable element connected with a part of said feeder to drive the same, a brake drum secured to said element to rotate therewith, a brake band extending about the brake drum and normally free with respect thereto, means adapted to shift the brake band circumferentially of the brake drum and in a direction opposite that in which said brake drum is rotated, and means for tightening said brake band on said brake drum and operated when the brake band is shifted as aforesaid.

14. In combination, a driven brake element, a flexible brake element extending circumferentially thereof, and means for applying and releasing the flexible brake element with respect to the driven brake element and comprising a member connected with one end of the flexible brake element and movable to shift it in opposite directions about said driven brake element, a rotatable cam, and a pivoted member connected with the opposite end of said flexible brake element and movable thereby into and out of the path of travel of said cam.

15. In combination, a circular brake element and a cam arranged to rotate in unison, a flexible brake element extending circumferentially of the circular brake element, means for shifting the flexible brake element circumferentially of said circular brake element in opposite directions respectively, and a brake applying member movable by said flexible brake element into and out of the path of travel of said cam.

16. In a brake mechanism for sheet feeders, a shiftable brake element for a driven part of the feeder and adapted to be applied on and released from said part, means for shifting the brake element in opposite directions when applying and releasing the same relative to said driven part, and applying and releasing means for the brake element rendered operative by said brake element when it is shifted in one direction and rendered inoperative when the brake element is shifted in the opposite direction.

17. In a brake mechanism for sheet feeders, a shiftable brake element for a driven part of the feeder and adapted to be applied on and released from said part, means for shifting the brake element in opposite directions when applying and releasing the same relative to said driven part, and means for applying the brake element as aforesaid including a member moved thereby to a position for operation when the brake element is shifted in one direction and moved to an inoperative position when said brake element is shifted in the opposite direction.

18. In a brake mechanism for sheet feeders, a shiftable brake element for a driven part of the feeder and adapted to be applied on and released from said part, means for shifting the brake element in opposite directions when applying and releasing the same relative to said driven part, and means for applying and releasing the brake element as aforesaid including a member connected therewith and moved thereby to a position for operation when the brake element is shifted in one direction, said member being moved by the brake element to an inoperative position when said brake element is shifted in the opposite direction.

19. In combination, a driven brake element, a brake element shiftable relative thereto, means for shifting the last named brake element in opposite directions circumferentially of the driven brake element, and means for applying the shiftable brake element to said driven brake element and rendered operative when the former is shifted circumferentially in one direction, said last named means being rendered inoperative when said shiftable brake element is shifted circumferentially in the opposite direction.

20. In combination, a driven brake element, a brake element shiftable relative thereto, means for shifting the last named brake element in opposite directions circumferentially of the driven brake element, a brake applying device movable by the shiftable brake element to a position for operation when the latter is shifted circumferentially in one direction, and means for operating the brake applying device when it is moved to said position, said last named means and said device being rendered inoperative when the shiftable brake element is shifted circumferentially in the opposite direction.

21. In combination, a driven brake element, a brake element shiftable relative thereto, means, including a lever connected with the last named brake element, for shifting it in opposite directions circumferentially of the driven brake element, and means for applying the shiftable brake element to the driven brake element and rendered operative when the former is shifted circumferentially in one direction, said last named means being rendered inoperative when said shiftable brake element is shifted circumferentially in the opposite direction.

22. In combination, a driven brake element, a brake element shiftable relative thereto, means for shifting the last named element in opposite directions, a brake applying lever connected with the shiftable brake element and movable thereby to operative and inoperative positions when it is shifted circumferentially in said directions, and means for operating the brake applying lever when it is moved to said operative position, said last named means being rendered inoperative when said lever is moved to said inoperative position.

23. In combination, a driven brake element, a brake element shiftable relative thereto, means for shifting the last named brake element, a lever for applying the shiftable brake element to said driven brake element and movable by the former when it is shifted by said means, and a driven cam for operating the brake applying lever when it is moved by said shiftable brake element.

24. In combination, a driven brake element, a brake element shiftable relative thereto, means for shifting the last named brake element in opposite directions, a driven lever operating cam, and a brake applying lever connected with the shiftable brake element and movable into and out of the path of travel of said cam when the said shiftable brake element is shifted in said directions.

25. In combination, a driven brake element, a flexible brake element shiftable relative thereto, means connected with one end of the last named brake element for shifting it in opposite directions, a driven lever operating cam, and a brake applying lever connected with the opposite end of said flexible brake element and movable into and out of the path of travel of said cam when the flexible brake element is shifted as aforesaid.

26. In combination, a driven brake drum, a flexible brake element thereon, means, including a lever connected with one end of the flexible brake element, for shifting it in opposite directions about said drum, a driven lever operating cam, and a brake applying lever connected with the opposite end of said flexible brake element and movable into and out of the path of travel of said cam when the flexible brake element is shifted as aforesaid.

27. In combination, a driven brake element, a brake element shiftable relative thereto, means for shifting the last named brake element, a driven brake lever operating cam, a brake applying lever normally positioned exteriorly of the path of travel of the cam, and means connecting the brake applying lever with the flexible brake element whereby shifting of the same moves the lever into the path of travel of the cam and the latter operates said lever.

28. In combination, a driven brake drum, a flexible brake element extending therearound, means for shifting the flexible brake element bodily in one direction about the driven brake drum and connected with one end of said element, a driven brake lever operating cam, a brake applying lever normally positioned exteriorly of the path of travel of the cam, and means connecting the brake applying lever with the opposite end of the flexible brake element whereby shifting of the same bodily in said direction moves the lever into the path of travel of said cam and the latter operates said lever.

29. In combination, a driven brake element, a flexible brake element shiftable relative thereto, means connected with one end of the flexible brake element and adapted to shift it relative to said driven brake element to thereby release the former from the latter, means connected with the opposite end of the flexible brake element for applying the latter to said driven brake element and stopping rotation thereof, said applying means being movable by the flexible brake element when it is shifted by said first named means, and means for operating the applying means when it is moved as aforesaid.

30. In combination, a driven brake element, a flexible brake element associated with the driven brake element and bodily shiftable relative thereto, means for bodily shifting the flexible brake element in opposite directions relative to the driven brake element, and means for applying the flexible brake element to said driven brake element when the former is shifted in one direction, said flexible brake element adapted to stop rotation of said driven brake element when applied thereto and said last named means being rendered inoperative when the flexible brake element is shifted in the opposite direction by said shifting means.

GEORGE A. MARTIN.